(12) United States Patent
Maestle et al.

(10) Patent No.: US 6,847,486 B2
(45) Date of Patent: Jan. 25, 2005

(54) LOW-PDL BEAM SPLITTER

(75) Inventors: Rudiger Maestle, Boeblingen (DE); Bernd Nebendahl, Ditzingen (DE)

(73) Assignee: Agilent Technologies, Inc, Palo Alto, CA (US)

( * ) Notice: Subject to any disclaimer, the term of this patent is extended or adjusted under 35 U.S.C. 154(b) by 0 days.

(21) Appl. No.: 10/156,340

(22) Filed: May 28, 2002

(65) Prior Publication Data

US 2003/0112524 A1 Jun. 19, 2003

(30) Foreign Application Priority Data

Dec. 14, 2001 (EP) .............................. 01129780

(51) Int. Cl.$^7$ .............................. G02B 1/10; G02B 27/10
(52) U.S. Cl. ...................................... 359/618; 359/583
(58) Field of Search ................................. 359/618, 641, 359/368, 367, 583; 385/11, 36, 140

(56) References Cited

U.S. PATENT DOCUMENTS

| 3,741,625 A | * | 6/1973 | Saleh | 359/583 |
|---|---|---|---|---|
| 4,492,436 A |  | 1/1985 | Bergmann | 385/11 |
| 5,699,187 A | * | 12/1997 | Fukushima et al. | 359/583 |
| 5,740,288 A |  | 4/1998 | Pan | 385/11 |
| 6,014,475 A |  | 1/2000 | Frisken | 385/11 |
| 6,016,216 A |  | 1/2000 | Chang | 359/285 |
| 6,339,661 B1 | * | 1/2002 | Kokkelink et al. | 385/11 |
| 6,430,323 B1 | * | 8/2002 | Kokkelink et al. | 385/11 |
| 2002/0118904 A1 | * | 8/2002 | Man et al. | 385/11 |
| 2002/0131755 A1 | * | 9/2002 | Liu et al. | 385/140 |

FOREIGN PATENT DOCUMENTS

| EP | 0 786 681 A1 | 7/1997 |
|---|---|---|
| EP | 0 855 607 A2 | 7/1998 |
| EP | 1 001 287 A2 | 5/2000 |
| WO | WO 01/07947 A1 | 2/2001 |
| WO | WO 01/10069 A2 | 2/2001 |

* cited by examiner

Primary Examiner—Georgia Epps
Assistant Examiner—Alicia M Harrington

(57) ABSTRACT

A beam splitter comprises a splitting device receiving at a first surface a first incident beam in an angle α with respect to the optical axis. A portion of the first incident beam will be reflected at the first surface at the angle α to the optical axis on opposite side with respect to the first incident beam. A second beam will be transmitted through the splitting device. The angle α is selected that the reflected portion is substantially independent of the state of polarization of the first incident beam.

15 Claims, 5 Drawing Sheets

LOW-PDL BEAM SPLITTER

BACKGROUND OF THE INVENTION

1. Field of the Invention

The present invention relates to optical beam splitters as devices for splitting up an incident optical beam into a plurality of sub-beams.

2. Discussion of the Background Art

Beam splitters are well known in the art and frequently applied in various different optical applications. A typical beam splitter comprises e.g. an etalon tilted 45° with respect to the incident beam. One portion of the incident beam will be reflected and another portion transmits through the beam splitter. The coupling ratio depends on the reflection/transmission properties of the etalon.

Different types of beam splitters can be applied for fiber optic applications. Such fiber optic beam splitters, also called couplers, are generally made up of fused fibers where two or more fibers with at least partially removed claddings are melt together.

U.S. Pat. No. 4,492,439 discloses a polarization independent beam splitter provided by a thin plate of birefringent material having a thickness chosen to interchange the characteristic polarization of the beam between the faces of the plate. The reflection/refraction ratio at the two boundaries are then complementary and the combined effect is insensitive to the polarization of the incident beam in the Brewster angle.

SUMMARY OF THE INVENTION

It is an object of the present invention to provide an improved beam splitter. The object is solved by the independent claims. Preferred embodiments are shown by the dependent claims.

A beam splitter according to the present invention comprises a splitting device receiving an incident beam in an angle $\alpha$ with respect to the normal to the splitting device surface receiving the incident beam (for the sake of simplicity referred to as the 'optical axis'). The angle $\alpha$ is to be selected that reflection at the splitting device is substantially independent of the polarization of the incident beam. Or, in other words, the angle $\alpha$ is to be selected in a range, wherein the reflectivity of the splitting device is substantially the same for parallel (i.e. parallel to the plane built by the vector of propagation an the optical axis) and perpendicular (i.e. perpendicular to the plane built by the vector of propagation and the optical axis) polarization of the light.

For a transition between air and glass at the splitting device, the angle $\alpha$ is preferably selected to be smaller than 1° to obtain a polarization dependent loss (PDL) smaller than 8 mdB. PDL shall mean here the ratio between maximum and minimum reflection or transmission for any state of polarization even though there are no losses connected with this difference.

The splitting device reflects a portion of the incident beam at the same angle $\alpha$ to the optical axis, however, on opposite side with respect to the incident beam. The ratio of the intensities of the reflected beam with respect to the incident beam depends on the angle $\alpha$, on the index of refraction of the splitting device and eventually on a coating (if provided) of the splitting device. However, due to the selection criteria for the angle $\alpha$, the coupling ratio of the reflected beam will be substantially independent of the state of polarization of the incident beam. Thus, PDL can be reduced to a minimum.

In addition to the reflected beam, the splitting device is further designed to provide a second beam transmitting through the splitting device. The splitting device is preferably designed that the transmitted beam leaves the splitting device parallel to the optical axis. Preferably, the transmitted beam leaves the splitting device surface on opposite side with respect entry side of the incident beam, thus having substantially the same propagation direction as the incident beam. However, small angular displacements with respect to the propagation direction of the incident beam might be advantageous e.g. when avoiding interference effects as explained later.

Corresponding to the reflected beam, the intensity of the transmitted beam with respect to the intensity of the incident beam will be substantially independent of the state of polarization of the incident beam due to the selection criterion of the angle $\alpha$. In case losses can be neglected, the intensities of the reflected and the transmitted beam will sum up to the intensity of the incident beam.

Thus, the invention provides a beam splitter having a splitting or coupling ratio that is substantially independent of the state of polarization of the incident beam, so that PDL can be minimized. It has been shown that beam splitters with PDL smaller than 10 mdB can be easily achieved.

In a preferred embodiment, the splitting device is provided to be wedge-shaped in order to avoid interference effects in the transmitted (output) beam. However, other shapes such as etalons, prisms or even lenses can be applied accordingly. Alternatively or in addition for reducing/avoiding interference effects in the second beam, the splitting device may be provided to be anti-reflective coated on one side.

In a preferred embodiment, a collimating device (e.g. a lens or a concave mirror) is provided at the incident side (i.e. the side of the splitting device receiving the incident beam) of the splitting device, so that the incident beam as well as the reflected beam will pass the collimating device. Thus, small angles $\alpha$ can be realized even for compact designs with reduced available space.

In one embodiment, a first optical fiber for emitting the incident beam and a second optical fiber for receiving the reflected beam are provided in close proximity to each other. Preferably, the first and second fibers are attached to each other using a capillary with an inner diameter of at least twice the diameter of the fibers or a double V-groove where the fibers are attached e.g. using glue. The incident beam from the first fiber is collimated by the collimating device and sent to the splitting device under the angle $\alpha$. The reflected beam will be focused accordingly by the collimating device into the second fiber. The angle $\alpha$ is determined by the distance d of the centers of the fibers and the focal length f of the collimating device by the following equation $\tan(\alpha)=d/2f$.

The splitting device can be provided on its incident side with a coating material in order to influence the coupling ratio. Accordingly or alternatively, the material of the splitting device can be selected in order to influence the coupling ratio. In one embodiment, the properties of the splitting device can be modified in order to vary the splitting ratio. This can be accomplished e.g. by moving the splitting device with a variable thickness metallic coating perpendicular to the optical axis along the thickness gradient.

By carefully selecting the material of the splitting device, PDL can be minimized also over a wide wavelength range; e.g. the wavelength dependency of an air glass transition is small due to the low dispersion of normal glasses. If coatings are to be used a special process has to be developed to yield low PDL for that coating.

In a further embodiment, a compensator is provided within the reflected beam and due to the small separation of incident and reflected beam usually as well in the incident beam in order to balance remaining differences in transmission for different states of polarization of the reflected beam. A preferred embodiment of such an compensator would be another etalon or wedge that can be rotated and tilted with respect to the beam to introduce additional polarization dependent transmission that compensates the effect of the polarization dependent reflection.

For focusing the transmitted beam e.g. into a third fiber, a second collimating device can be provided between the splitting device and the third fiber. Another embodiment reflects the transmitted beam back through the first collimating element into a third fiber in the vicinity of the first two fibers.

To minimize reflections from the fiber ends back into the fiber angled fiber ends can be used. These angled fiber end give rise to additional polarization depended transmission. Further improvements of the polarization dependency when coupling out of or back into a fiber can be achieved e.g. by applying an anti reflection coating on the fibers. Accordingly or alternatively it is possible to rotate the angled fibers odd multiplies of 90° around the optical axis with respect to each other. Since angled fibers when aligned with the optical axis pass the beam through the collimating device outside the center and therefore can rise to polarization dependent transmission, it is a further improvement to rotate the fibers in such a way that the beam will pass the collimating device in the center. Additionally the collimating device can be designed with a smaller numerical aperture, which leads to an improved performance over wavelength.

In a further embodiment, the inventive beam splitter will be applied from both sides of the splitting device, so that the beam splitter receives incident beams at opposite sides of the splitting device. For the sake of simplicity, the incident beam of the above explanations shall be referred to as 'the first incident beam', while an incident beam received at another (preferably opposite) side of the splitting device shall be referred to as 'the second incident beam'. In that case the second incident beam is directed to the splitting device with opposite propagation direction than the reflected beam, it will be split up by the splitting device just in accordance with the above said, however with opposite propagation directions. One portion of the second incident beam will be transmitted through the splitting device towards the source of the first incident beam (as provided from the other side of the splitting device). The other portion of the second incident beam will be reflected and travel back with substantially the same angular displacement as the second incident beam but on opposite side with respect to the optical axis. Such device might also be used as a four-port coupler. A four port coupler can also be built by combining two independent splitting devices as described above or by using both faces of the splitting device in contrast to the first embodiment where only one surface is used to reflect the beams travelling in opposite directions.

In order to reduce unwanted reflection back into the beam splitter (e.g. resulting from a monitor coupled an output thereof), the splitting device might be provided with two reflective surfaces, so that the first incident beam will be reflected partially into the first reflected portion by one of the reflective surfaces, whereas the second incident beam will be reflected partially into the second reflected portion by the other one of the reflective surfaces. Alternatively, a second splitting device can be provided and each of the two splitting devices bears one reflective surface. In that case, the first incident beam will be reflected partially into the first reflected portion by the reflective surface of the (first) splitting device, whereas the second incident beam will be reflected partially into the second reflected portion by the reflective surface of the second splitting device.

To adjust the ratio of reflected and transmitted power, each splitting device can be provided with a variable reflection coating and/or can be made of a material with variable index of refraction. The variation of reflection or the variation of the index of refraction of each splitting device can be provided along an axis substantially perpendicular to the optical axis. Each splitting device may also be moved along this axis.

BRIEF DESCRIPTION OF THE DRAWINGS

Other objects and many of the attendant advantages of the present invention will be readily appreciated and become better understood by reference to the following detailed description when considering in connection with the accompanied drawings. Features that are substantially or functionally equal or similar will be referred to with the same reference sign(s).

DETAILED DESCRIPTION OF THE INVENTION

Figure 1:
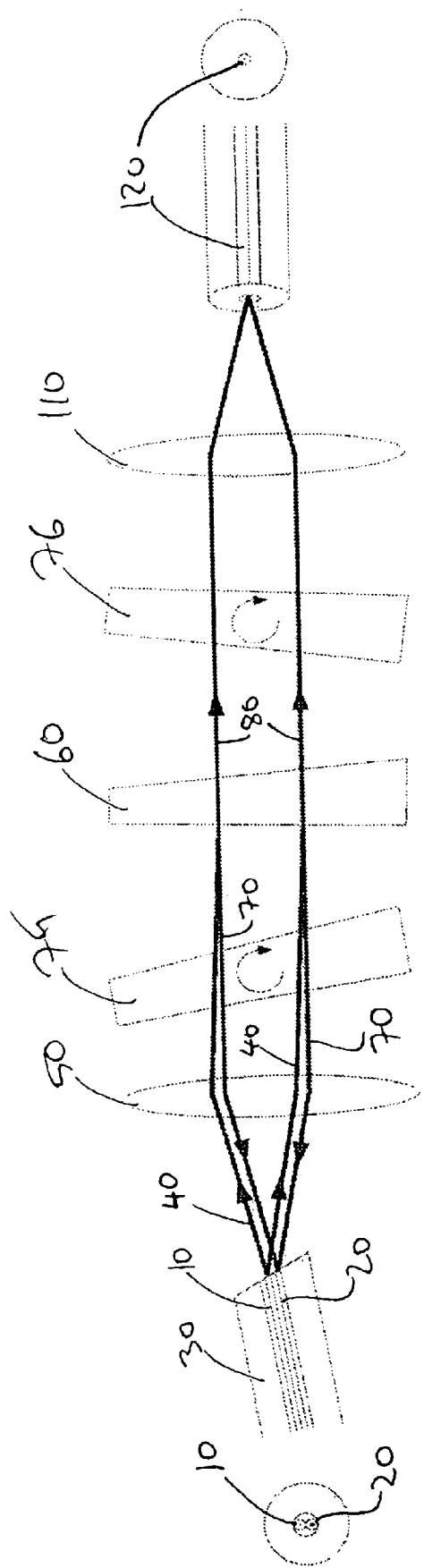
FIG. 1 shows a first embodiment of a beam splitter according to the present invention.

In FIG. 1, two optical fibers 10 and 20 are provided in a ferrule 30. The first fiber 10 emits a first beam 40 collimated by a lens 50 and directed towards a splitting device 60.

Figure 2A:
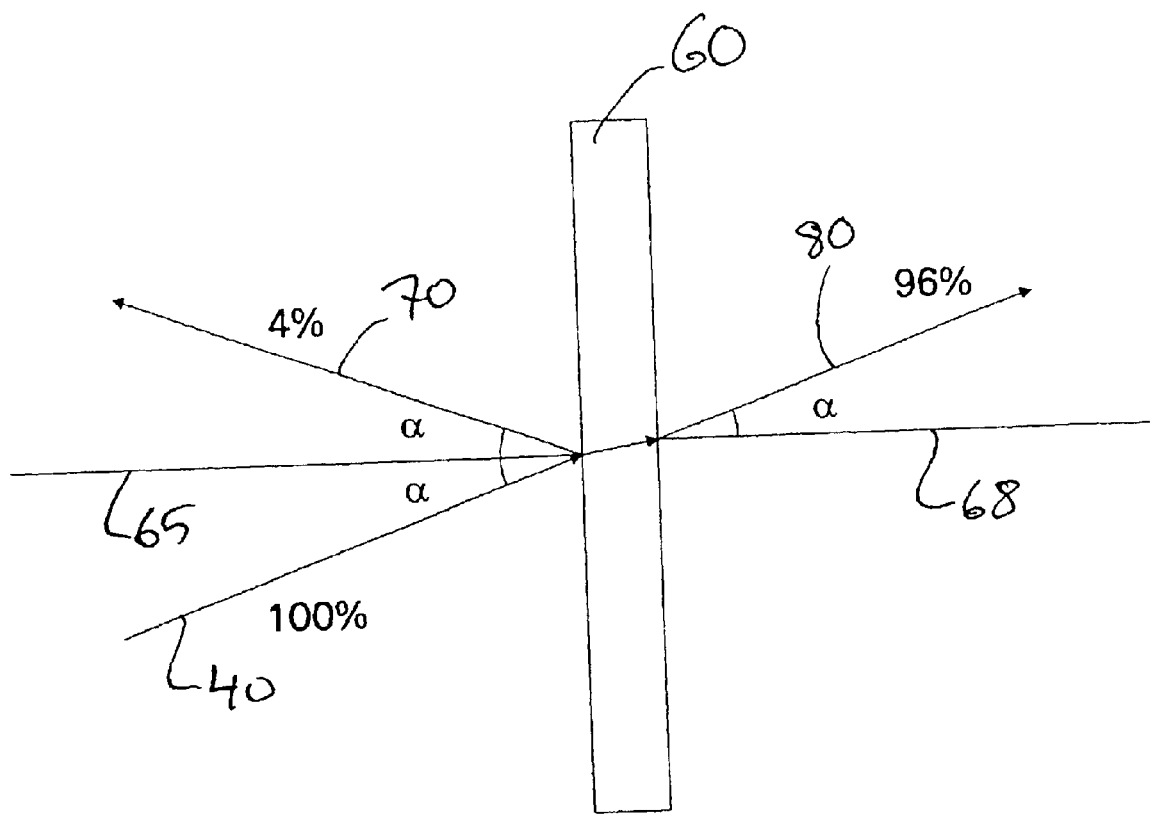
FIGS. 2A and 2B illustrate the principle for designing the inventive beam splitter.

As seen from FIG. 2A, the beam 40 is directed in an angle $\alpha$ with respect to a normal 65 of the incident side of the splitting device 60. The splitting device 60 splits up the incident beam 40 into a reflected beam 70 and a transmitted beam 80. The reflected beam 70 travels also with the angle $\alpha$ to the normal 65 but with opposite propagation direction and on opposite side of the normal 65 than the incident beam 40. The transmitted beam 80 leaves the splitting device 60 also with the angle $\alpha$ to a normal 68 (of a side of the splitting device 60 where the transmitted beam 80 leaves the splitting device 60) and with the same propagation direction than the incident beam 40 (plus a lateral displacement between the normals 65 and 68). The example of FIG. 2A illustrates a splitting rate of 4% for the reflected beam 70 and 96% for the transmitted beam 80 (neglecting potential losses).

Turning again to FIG. 1, the beam 70 reflected at the splitting device 60 will be focused by the lens 50 into the second fiber 20. The transmitted beam 80 will also be focused by a lens 110 into a third fiber 120.

Figure 2B:
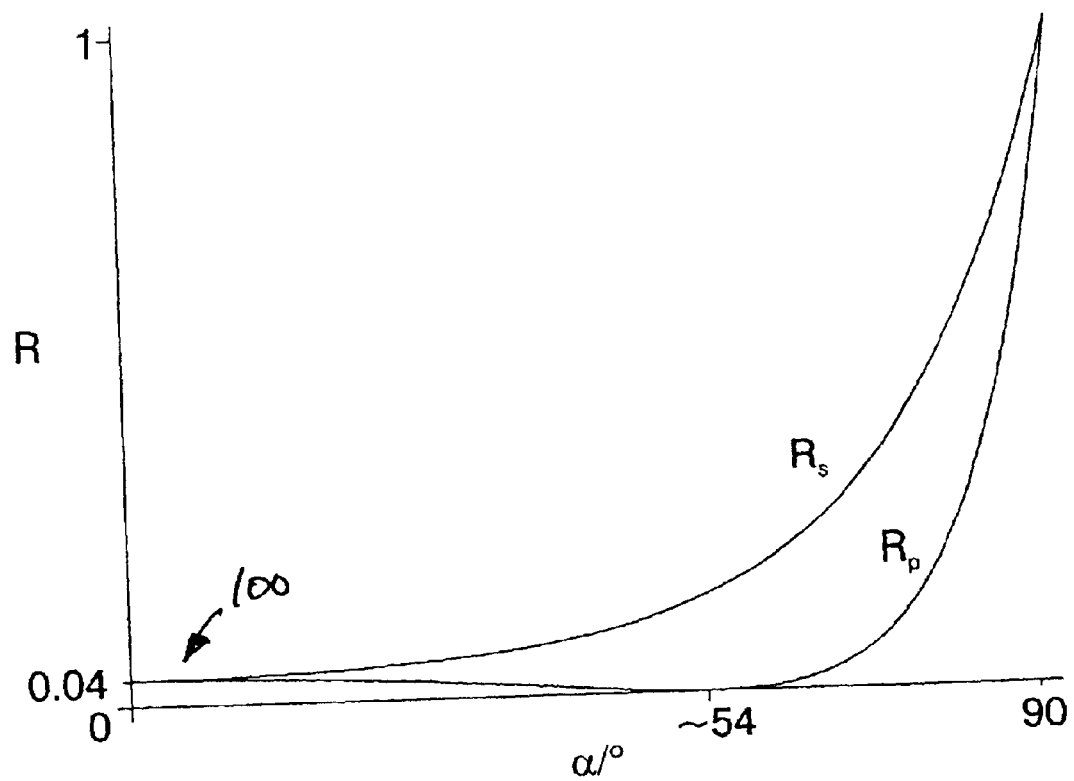

FIG. 2B illustrates the principle to design the angle $\alpha$. The reflectivity R at the splitting device 60 is shown for parallel (p) and perpendicular (s) polarized light and their dependencies from the angle $\alpha$ of the incident beam 40. In an area 100, the reflectivity of parallel (Rp) and perpendicular (Rs) polarized light is substantially equal. In the example of FIG. 2B for an air-glass transition, the area 100 is for relatively small angles $\alpha$ (here: smaller than about 5°), and the differences between parallel and perpendicular polarized light increase with increasing angle α. When designing the angle α in the range 100, the reflection becomes substantially independent of the state of polarization of the incident beam 40. For angles smaller than about 1° in the example of FIG. 1, PDL values smaller than 8 mdB can be obtained.

A compensator 75 can be provided within the reflected beam 70 in order to balance remaining differences in the state of polarization of the reflected beam. This can be achieved by placing an etalon or wedge in the beam that can be rotated around the optical axis and tilted perpendicular to it. The polarization dependent transmission through the first and—if there is no anti reflection coating applied—through the second air glass interface can be used to compensate for any remaining polarization dependency of the reflection. A second compensator 76 has to be placed after the splitting device 60 if the output port should be compensated as well.

In order to avoid interference in the transmitted beam 80, the splitting device 60 is preferably provided to be wedge-shaped. Additionally, the wedge can be chosen such that the transmitted beam is parallel to the optical axis. The second optical surface is preferably be anti-reflection coated to avoid losses together with a polarization dependency and additional unwanted reflections.

The fibers 10, 20, 120 and 130 could be chosen to be single mode fibers. For the sake of easy adjustment, the fibers 20 and 130 can be chosen to be multi-mode.

Figure 3A:
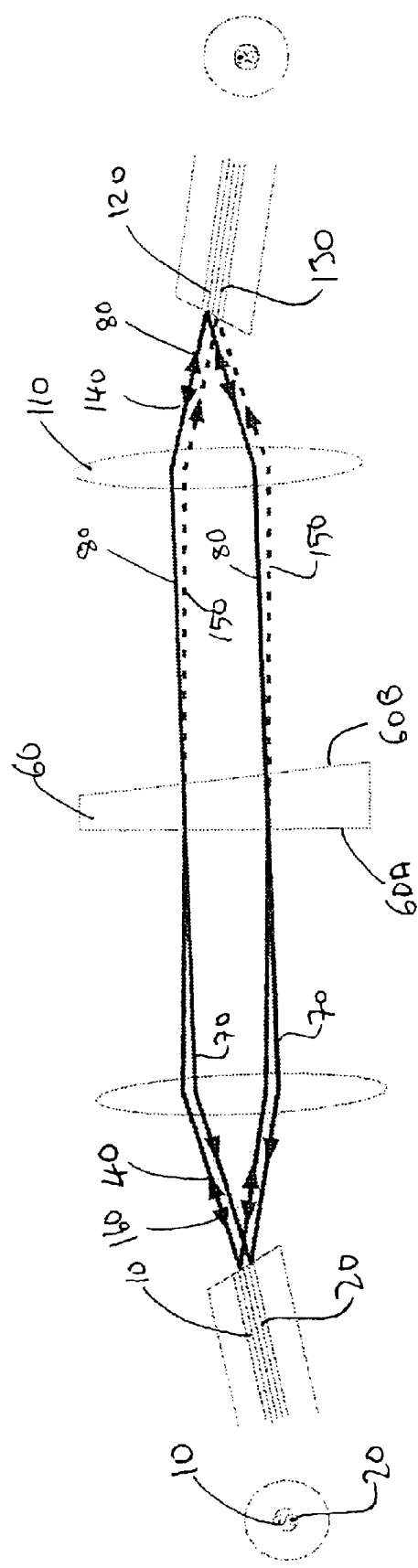
FIG. 3 illustrate further embodiments of the inventive beam splitter operated from opposite sides.

In the example of FIG. 1, the fiber ends of the fibers 10 and 20 are provided angled in order to avoid back reflections of the fiber ends. Further the fibers 10 and 20 might be provided tilted with respect to the normal of the splitting device 60 in this case in order to pass the beam through the center of the collimating device. In FIG. 3A, a fourth fiber 130 is provided close to the third fiber 120. The arrangement of the fibers 120 and 130 can be in accordance with the above said for fibers 10 and 20. The directions and angles of the beams are illustrated in FIG. 3B.

Figure 3B:
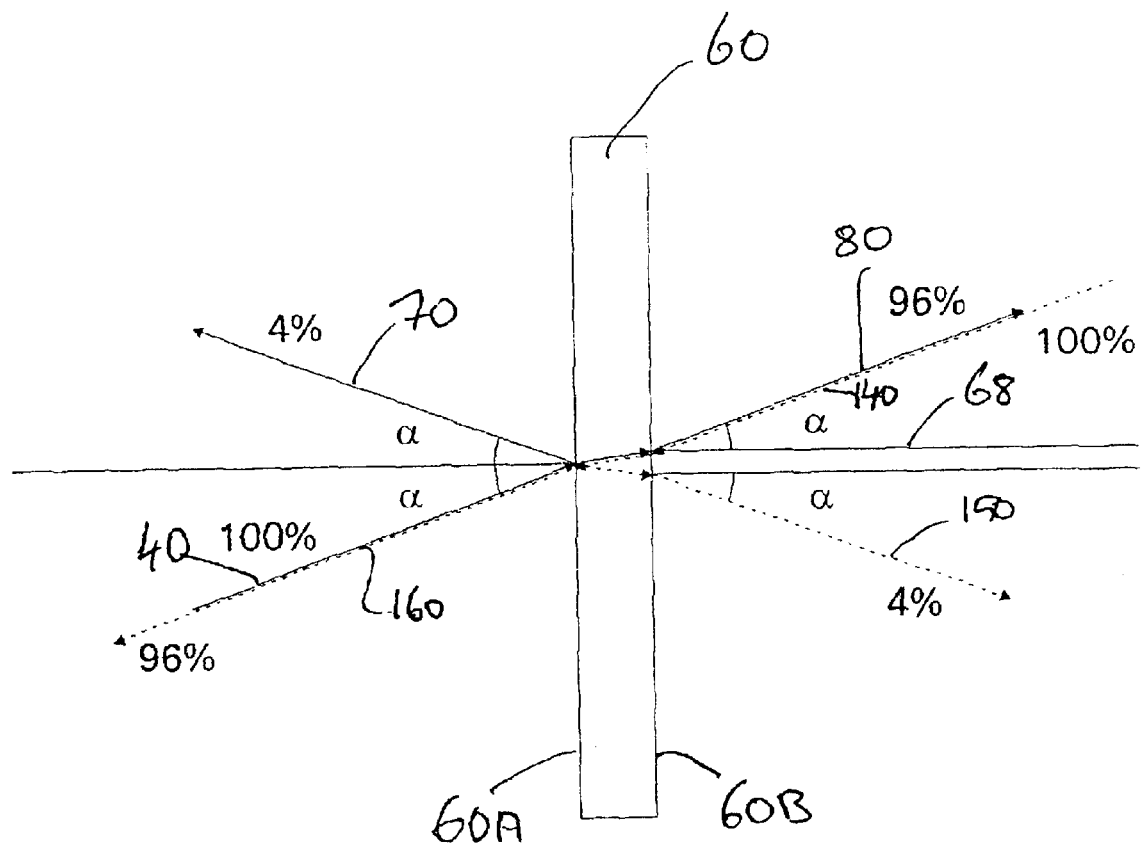

In operation, a beam 140 (broken line in FIG. 3A) emitted from the fiber 120 will be collimated by the lens 110 and directed towards the splitting device 60 in the angle α (to the normal 68—see FIG. 3B). In accordance with the above said, one portion 150 will be reflected back towards the lens 110 and the other portion 160 (broken line in FIG. 3B) will be transmitted through the splitting device 60 and focused by the lens 50 into the fiber 10. The beam 150 reflected back towards the lens 110 will be focused into the fiber 130.

Due to the symmetry of the beam splitting arrangements in FIGS. 1 and 3, it is clear that instead of coupling in the beam from fiber 10 or fiber 120 also fibers 20 and 130 can be applied for emitting light towards the splitting device 60 if only single mode fibers are used.

While the arrangement of FIG. 1 can be regarded also as a three-port coupler, the arrangement of FIG. 3 can be regarded as a four-port coupler.

In order to reduce unwanted reflection back into the beam splitter 60 (e.g. resulting from a monitor coupled to fiber 120), the beam splitter 60 might be provided with two reflective surfaces 60A and 60B, so that the first incident beam 40 will be reflected partially into the first reflected portion 70 by the reflective surface 60A, whereas the second incident beam 140 will be reflected partially into the second reflected portion 150 by the reflective surface 60B.

The two reflective surfaces 60A and 60B might also be provided on two individual splitting devices (not shown in the Figures) each bearing one reflective surface. In that case, the first incident beam 40 will be reflected partially into the first reflected portion by the reflective surface of the (first) beam splitter 60, whereas the second incident beam 140 will be reflected partially into the second reflected portion by the reflective surface of the second beam splitter.

What is claimed is:

1. A beam splitter comprising:
    a splitting device adapted for receiving at a first surface a first incident beam in an angle α with respect to an optical axis, for reflecting at the first surface a first portion of the first incident beam at the angle α to the optical axis on opposite side with respect to the first incident beam, and for providing a second beam transmitted through the splitting device,
    a first optical fiber for emitting the first incident beam via an end thereof and one of a second optical fiber or a detection device for receiving the reflected portion via an end thereof,
    a collimating device provided at the incident side of the splitting device, so that at least one of the first incident beam or the reflected beam will pass the collimating device,
    wherein the angle α is selected so that the first reflected portion is substantially independent of the state of polarization of the first incident beam and based on at least one characteristic of the collimating device and a distance between the ends of the first and second optical fibers.

2. The beam splitter of claim 1, wherein the angle α is selected in a range, wherein the reflectivity of the splitting device is substantially the same for a parallel polarization and a perpendicular polarization of said first incident beam, relative to the plane built by the vector of propagation and the optical axis polarization of the first incident beam.

3. The beam splitter of claim 1, wherein the second beam leaves the splitting device parallel to the optical axis.

4. The beam splitter of claim 3, wherein the second beam leaves the splitting device parallel on the opposite side with respect entry side of the first incident beam.

5. The beam splitter of claim 1 wherein the splitting device is provided of glass and the angle α is selected to be smaller than 5°.

6. The beam splitter of claim 1, wherein the splitting device is provided to be anti-reflective coated on one side or wedge-shaped in order to avoid interference effects in the second beam.

7. The beam splitter of claim 1, wherein the first optical fiber and the second optical fiber or the detection device are provided in close proximity to each other, preferably attached to each other.

8. The beam splitter of claim 1, further comprising at least one compensator in at least one of the beams for balancing remaining differences in state of polarization.

9. The beam splitter of claim 1, wherein for adjusting a ratio of reflected and transmitted power the splitting device is provided with a coating having a variable reflection, or is made of a material having a variable index of refraction.

10. The beam splitter of claim 9, wherein the variable reflection or the variable index of refraction is provided along a second axis substantially perpendicular to the optical axis or the splitting device can be moved along the second axis.

11. The method of claim 1, wherein the ratio of the intensities of the first reflected portion with respect to the first incident beam is controlled by controlling one of the angle α, the index of refraction of the splitting device, or a coating of the splitting device.

12. A beam splitter comprising:
    a splitting device adapted for receiving at a first surface a first incident beam in an angle α with respect to an optical axis, for reflecting at the first surface a first portion of the first incident beam at the angle α to the optical axis on opposite side with respect to the first incident beam, and for providing a second beam transmitted through the splitting device, wherein the angle α is selected so that the first reflected portion is substantially independent of the state of polarization of the first incident beam, and wherein the splitting device further receives a second incident beam in the angle α with respect to the optical axis but on opposite side with respect to the first incident beam.

13. The beam splitter of claim 12, wherein the second incident beam is directed with opposite propagation direction than the second beam, so that a second portion of the second incident beam transmitted through the splitting device will leave the splitting device with opposite propagation direction than the first incident beam.

14. The beam splitter of claim 12, further comprising a third optical fiber for receiving the second beam or emitting the second incident beam, and a fourth optical fiber for receiving a second reflected portion of the second incident beam.

15. The beam splitter of claim 12, wherein the first incident beam is reflected partially into the first reflected portion by a first surface of the splitting device, whereas the second incident beam is reflected partially into the second reflected portion by either a second surface of the splitting device or by a first surface of a second splitting device.

* * * * *